United States Patent
McCrickered et al.

[11] 3,723,010
[45] Mar. 27, 1973

[54] HOLOGRAPHIC METHOD AND APPARATUS FOR CHECKING THE OPTICAL CHARACTERISTICS OF TRANSPARENT MEMBERS

[75] Inventors: John T. McCrickered, Hawthorne; Milton M. T. Chang, Gardena, both of Calif.

[73] Assignee: Northrop Corporation, Los Angeles, Calif.

[22] Filed: Feb. 19, 1971

[21] Appl. No.: 116,862

[52] U.S. Cl..................................356/124, 356/237
[51] Int. Cl............................G04b 9/00, G01n 21/16
[58] Field of Search..............350/96 B, 3.5; 356/124

[56] References Cited

UNITED STATES PATENTS

| | | | |
|---|---|---|---|
| 3,486,825 | 12/1969 | Howland | 356/124 |
| 3,598,467 | 8/1971 | Pearson | 350/96 B |

OTHER PUBLICATIONS

"Hologram-Moire Intergerometry for Transparent Objects"; G. B. Brandt; 6 Applied Optics 5535.

*Primary Examiner*—Ronald L. Wibert
*Assistant Examiner*—Conrad Clark
*Attorney*—Sokolski & Wohlgemuth and W. M. Graham

[57] ABSTRACT

Coherent light as may be generated by a laser is passed through pattern forming means to generate a predetermined light pattern. This pattern of light passes through a standard or reference transparent member to a photosensitive plate on which a hologram of the image as optically affected by the transparent member is produced. Coherent light is then passed through a similar transparent member to be tested, the light pattern for the second member preferably differing from that for the first so as to facilitate a qualitative comparison between the two. The two patterns are compared for alignment with each other and a photographic record made which is capable of indicating the results of this comparison, the optical characteristics of the transparent member under test as compared with those of the reference member being determined from the degree of misalignment between the two patterns.

10 Claims, 9 Drawing Figures

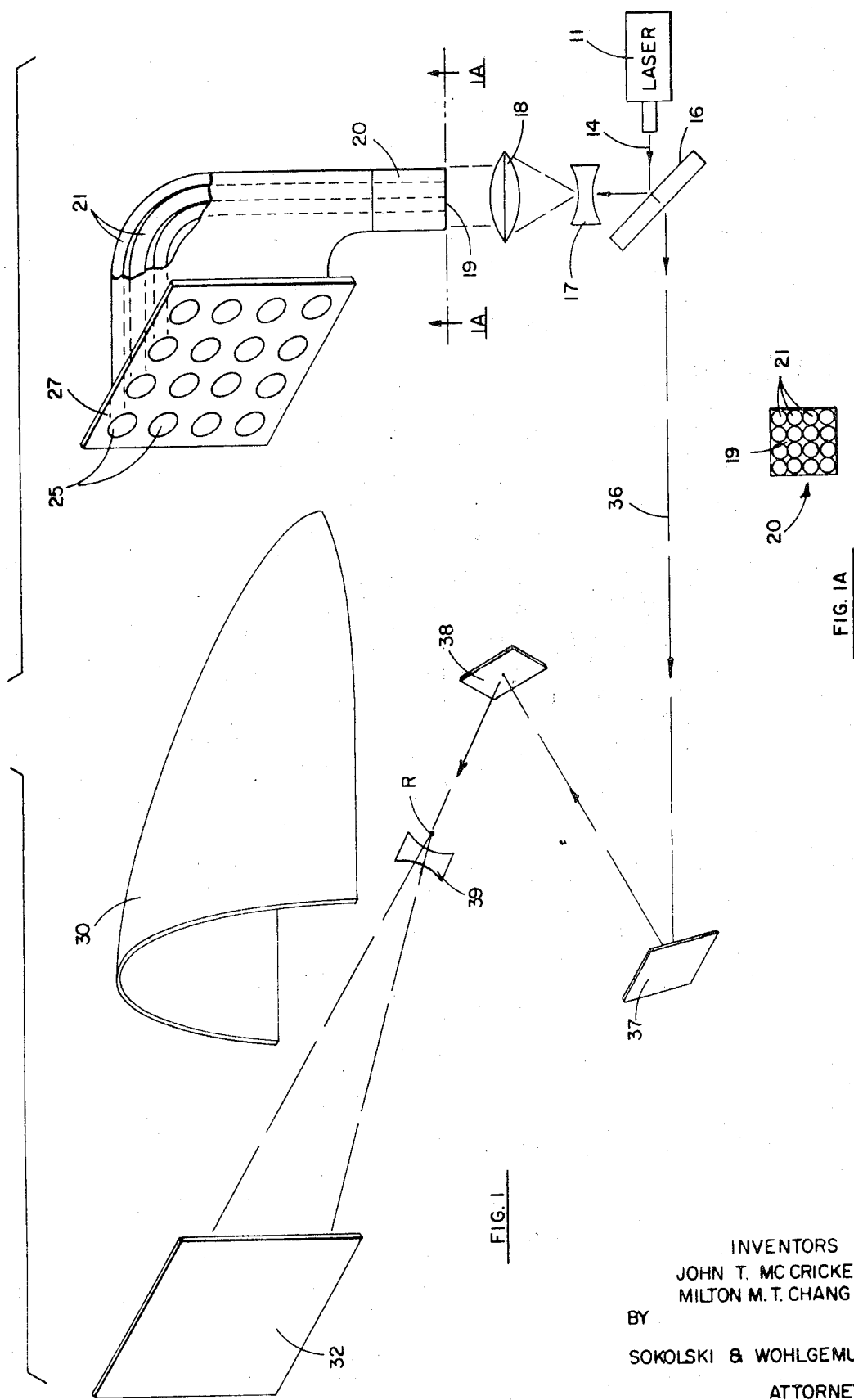

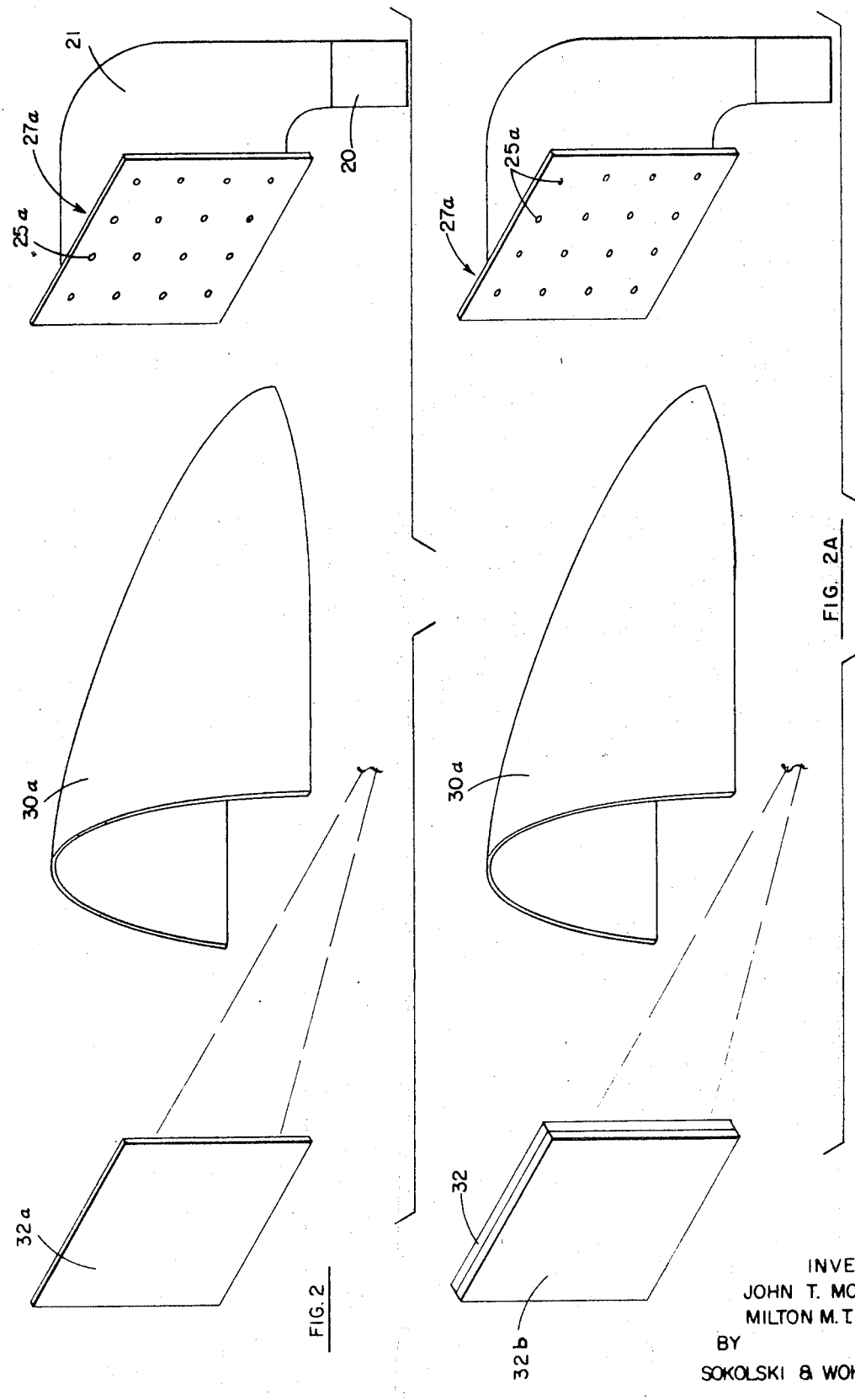

INVENTORS
JOHN T. MC CRICKERD
MILTON M. T. CHANG
BY
SOKOLSKI & WOHLGEMUTH
ATTORNEYS

HOLOGRAPHIC METHOD AND APPARATUS FOR CHECKING THE OPTICAL CHARACTERISTICS OF TRANSPARENT MEMBERS

This invention relates to the checking of the optical characteristics of transparent members such as aircraft windscreens, automobile windshields, and the like, and more particularly to such a method and apparatus using holographic techniques for providing three-dimensional information indicative of the optical characteristics of reference and test members for comparison.

It is essential that transparent members such as aircraft windscreens and automobile windshields be tested to assure that they are free of imperfections which might cause significant distortion of the light passing therethrough. When dealing particularly with aircraft windscreens having significant curvature in all three dimensions, it is difficult to detect imperfections which could present optical distortion in the pilot's field of view.

Present techniques for checking windscreens include the taking of a single photograph of a grid pattern through a candidate windscreen and attempting to determine windscreen distortions from this two-dimensional photographic image of the pattern. This technique has the limitation of only indicating the distortion as viewed from the position where the photographic lens is positioned, and has no capability of verifying distortions which might occur from slightly different positions. Thus, it is possible that while there may be no distortion if the pilot's eyes are located exactly in the position of the photographic lens, there could be distortion produced by the windscreen if he should move his head from that position. Further, this prior art technique involves a rather subjective evaluation of the grid patterns and does not accurately check the characteristics of the windscreen throughout the entire field of view thereof. Other techniques of the prior art involve the optical checking of small portions of the windscreen at a time. This process is somewhat time consuming and further does not provide a convenient method for making a single photographic record of the optical characteristics of the entire windscreen as is often required for subsequent reference.

The technique and apparatus of this invention overcome the aforementioned shortcomings of prior art techniques and apparatus in enabling the making of a single photographic plate which holographically indicates the optical characteristics of the entire viewing field of interest of a windscreen under test, as compared with a reference windscreen. This hologram contains three-dimensional information such that it represents the characteristics of the windscreen as looked through from any position in which the pilot might place his head when normally operating the aircraft. The variety of viewpoints is limited only by the bounds of the film-plate, as though it were a window through which the windscreen representation is viewed, and the plate size is selected to suit pilot head motion requirements. Further, with the technique of this invention, it is possible to obtain the desired measurement information for each windscreen under test in a relatively short period of time and with a single observation and photographic recording.

It is therefore an object of this invention to provide an improved technique and apparatus for measuring the optical characteristics of a transparent member such as an aircraft windscreen.

It is another object of this invention to simplify the accurate measurement of the optical characteristics of highly curved windscreens.

It is still a further object of this invention to provide a three-dimensional photographic image which represents the optical characteristics of a transparent member as compared with a reference.

Other objects of this invention will become apparent as the description proceeds in connection with the accompanying drawings, of which:

FIGS. 1–1A is a schematic view illustrating one embodiment of the device of the invention;

FIGS. 2–2A is a schematic view illustrating one technique for developing a pattern for a test windscreen in connection with the embodiment of FIG. 1;

Figure 3A:
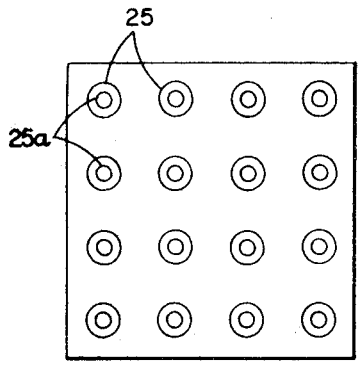
FIGS. 3A–3C are schematic views illustrating various typical images that could be generated with the embodiment of FIGS. 1 and 2.

Briefly described, the technique of the invention is as follows:

A repetitive light pattern which provides coherent light beams, or coherently illuminated figures, spaced from each other to cover a predetermined area is developed from a coherent light source such as a laser beam. This light pattern may be in the form of an array of light circles, each such circle being illuminated by means of a fiber optical element which receives coherent light from the laser. Light from this pattern is passed first through a standard or reference windscreen, which is known to have good optical characteristics, onto a photosensitive plate. The plate also receives a reference beam of coherent light, thus providing the necessary light signals for the generation of a hologram. The hologram so fabricated provides a reference for comparison with holograms made in similar fashion by passing light through windscreens under test. Preferably, different patterns are used for the reference and test holograms to facilitate the making of a comparison therebetween to determine if the test unit is within predetermined optical distortion tolerances.

Referring now to FIG. 1, an illustrative embodiment of the invention is schematically illustrated. The coherent light beam 14 generated by laser 11 is directed towards beam splitter 16 which reflects a portion of this light energy through concave lens assembly 17. The light beam is diverged by lens 17 and thence is collimated by means of convex lens 18 from where it provides the light input to fiber optical sheath 20. As can be seen in FIG. 1a, optical sheath 20 includes a plurality of fiber optical elements 21 which are bound together. The ends 19 of the elements are polished for efficient light transmission. Each of fiber optical elements 21 is utilized to transmit a beam of the coherent light to a separate one of apertures 25 formed in plate 27, the plate providing a support for the end of the fiber optical elements. For viewing convenience, apertures 25 can contain translucent diffuse material, such as ground glass. The light radiated through apertures 25 from the fiber optical elements 21 passes through windscreen 30 and impinges upon photosensitive plate 32.

Part of the light energy of beam 14 passes through beam splitter 16 to form beam 36. Beam 36 is reflected by mirrors 37 and 38 from where it passes through concave lens 39 to provide reference light for forming the hologram on photosensitive plate 32. It is to be noted that lens 39 forms a virtual point light source R for the reference. As is usual in holographic techniques, mirror 37 is positionally adjusted so as to make the optical path length of the reference light equal to that of the image light. In this manner, information corresponding to a three-dimensional image of the light source pattern provided by the fiber optical array as passed through windscreen 30 is placed on plate 32.

Figure 3B:
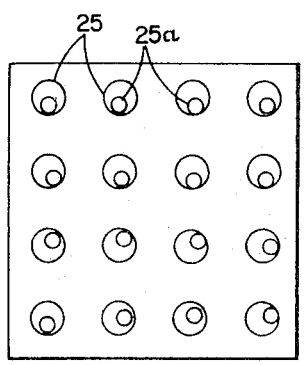
Figure 3C:
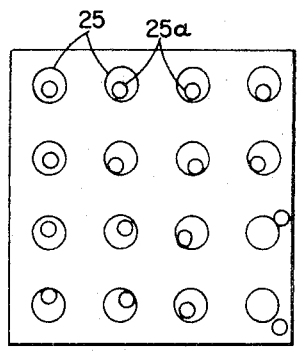

In one of the methods for practicing the invention, an image pattern with relatively large circles 25, as shown in FIG. 1, which are passed through a reference windscreen 30 are used in making a hologram on photosensitive plate 32. A hologram is then made in the same manner through a windscreen 30a to be tested as shown in FIG. 2. This time, however, the light outputs of the fiber optical units are passed through apertures 25a formed in plate 27a, apertures 25a having a much smaller diameter than that of apertures 25 shown in FIG. 1. The hologram 32 produced for the reference windscreen is then placed against the hologram 32a made for the windscreen under test, the two holographic plates being properly aligned with each other. Coherent light from the laser is then radiated through the superimposed plates and the plates viewed. FIG. 3A illustrates a pattern which might be obtained for a test windscreen having excellent characteristics, FIG. 3B a test windscreen having acceptable but marginal optical characteristics, and FIG. 3C a windscreen having unacceptable optical characteristics. In making this test it is necessary that the viewer move his head from side to side and up and down to view the holograms through all the various angles that the pilot's head might be in. It is necessary, of course, that the smaller circles remain within the larger ones for all of these angles to make for an acceptable candidate. Thus, a true three-dimensional test of the windscreen is made. The difference in diameters between the smaller circles 25a and the larger circles 25 represents the amount of distortion which is tolerable, these diameters being chosen in accordance with the particular test qualification criteria for the windscreen. It is also to be noted that the apertures 25 can be made a little bit larger towards the periphery of the pattern if it is felt that looser tolerances are permissible in this portion than in the central portion of the windscreen.

As an alternative to the procedure just described, the information on the comparison between the reference and test windscreens can be recorded in a single hologram as illustrated in FIG. 2A. Such a single hologram 32b is fabricated by placing the hologram 32 made for the reference windscreen in front of the photosensitive plate, as shown in FIG. 2A. The hologram for the test plate is superimposed on that made for the reference by passing the test images, generated by the light beams emanating from apertures 25a and passing through test windscreen 30a, through the reference plate and by passing the reference beam through the reference plate onto the test plate. The reference beam here serves two purposes. It both acts as reference beam for the test plate and also serves to reconstruct the holographic image of the reference windscreen and associated pattern. This technique, of course, has the advantage of providing all of the necessary information on a single plate for each unit tested. Also, with this second technique a real time viewing of the optical characteristics of the test windscreen 30a can be made while plate 32b is being exposed. A recording of the comparison between the test and reference windscreens can also be recorded on a single hologram by double exposing the same photosensitive plate, first with light passed through the reference windscreen and then with light passed through the test windscreen, in both instances using the technique described in connection with FIG. 1. This, of course has the disadvantage of requiring an exposure through the reference for each test as compared with using the same reference hologram for successive tests as described in connection with FIG. 2A.

Figure 4:
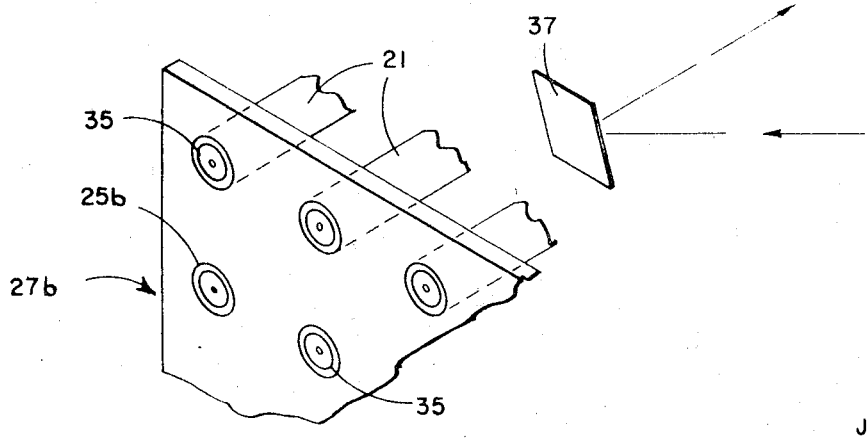
FIG. 4 is a schematic view illustrating an image generating plate which may be utilized in generating optical images in the device of the invention.

Referring now to FIG. 4, another type of plate which may be utilized in generating the light pattern is illustrated. With this plate 27b, the fiber optical elements 21 are each brought up to a separate one of apertures 25b of the plate. The apertures 25b, however, rather than being simple circles have ground glass elements 35 inserted therein, these ground glass elements having concentric rings etched thereon. Plate 27b thus may be utilized in forming the reference hologram, the various rings providing images which are utilized in establishing various tolerance criteria for the units being tested. Thus, for example, the outermost ring could be utilized as a tolerance criterion for the peripheral apertures i.e., those in the peripheral portions of the windscreen field of view; while the inner concentric ring is utilized as a criterion for the centrally located apertures.

Figure 5:
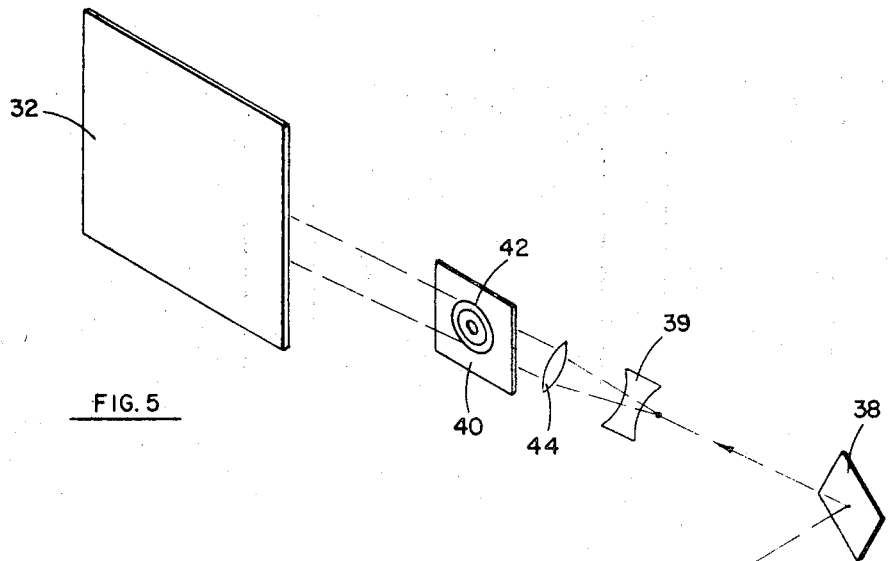
FIG. 5 is a schematic view illustrating means for generating a test image by placing a light filter in the reference beam used for making the hologram.

Referring now to FIG. 5, another technique for generating concentric tolerance rings in the reference hologram is schematically illustrated. This technique consists of a manipulation of the reference beam. Here, a plate 40 having a ground glass element 42 inserted therein is interposed between concave lens 39 and photosensitive plate 32. The illumination of plate 40 may be collimated for viewing convenience by means of convex lens 44 which is placed between lens 39 and plate 40. The image pattern of plate 27 (FIG. 1) or that of plate 27a (FIG. 2) could be used. Thus, the concentric ring image etched on ground glass unit 42 is carried only in the reference light for making the hologram and will appear in the holographic images of the light sources as affected by the windscreen in almost the same manner as for the embodiment of FIG. 4.

It is to be noted that many different variations of the basic techniques described can be utilized to satisfy different application requirements. Also, different plates 40 having ground glass elements 42 with different diameter concentric rings can be substituted to satisfy different test requirements.

Thus, the technique and apparatus of this invention provides simple yet highly effective means for measuring the optical characteristics of a transparent member such as a windscreen. By virtue of the holographic techniques utilized, it is possible to obtain a single hologram which has accurate information as to the optical characteristics of the entire windscreen, this test accurately simulating the viewing encountered under actual operating conditions.

While this invention has been described and illustrated in detail, it is clearly to be understood that this is intended by way of illustration and example only, the spirit and scope of this invention being limited only by the terms of the following claims.

We claim:

1. A method for checking the optical characteristics of a transparent member comprising the steps of:

passing coherent light arranged in a predetermined geometric pattern covering a predetermined area through a transparent reference member, having the sought-for optical characteristics, onto a photosensitive plate while simultaneously exposing said photosensitive plate to coherent reference light which has not passed through the reference member, the plate thus being exposed so as to produce a reference hologram, passing coherent light through a transparent member to be tested which is similar to said reference member, said light being arranged in a similar geometric pattern to that for making the reference hologram, onto a plate member while simultaneously radiating coherent reference light which has not passed through the reference member onto the plate member, and visually comparing the geometric light pattern generated in said last mentioned step with that generated in said first mentioned step for spatial coincidence, the light patterns for the reference member and the member to be tested each comprising a series of spaced geometric figures, each of said figures defining a perimeter, the spacing between the centers of the figures for the two patterns being equal, the figures for one of said members being larger than those for the other of said members.

2. The method of claim 1 wherein the plate member receiving the light from the member to be tested is photosensitive, a second hologram being made on said last mentioned plate member.

3. The method of claim 2 wherein the light patterns are compared by overlaying the two holograms in alignment with each other and radiating a coherent light beam thereon while viewing the overlaying light patterns.

4. The method of claim 2 wherein the reference hologram is overlaid on the photosensitive plate member in alignment therewith so that the last mentioned plate member reproduces the optical information on said reference hologram along with the optical information for said member being tested.

5. The method of claim 1 wherein the same photosensitive plate is exposed to light passing through the reference member and to the light passing through the member to be tested to make a double exposure hologram on said plate.

6. The method of claim 5 wherein the light patterns are compared by radiating a coherent light beam onto the double exposure hologram while viewing the light patterns thereon.

7. The method of claim 1 wherein said geometric figures are circles.

8. The method of claim 1 wherein the coherent light is arranged in a pattern by passing the beam from a laser through fiber optical elements and arranging the light output ends of said elements on a support in the desired pattern.

9. The method of claim 8 wherein the light from the ends of the fiber optical elements are passed through ground glass elements having concentric rings etched thereon to provide reference indicia for comparing the light patterns.

10. The method of claim 8 wherein the reference light for exposing said photosensitive plate is passed through a ground glass window having concentric rings etched thereon to provide reference indicia in the pattern formed on the plate.

* * * * *